United States Patent [19]
Carr et al.

[11] 3,825,307
[45] July 23, 1974

[54] MEANS FOR DETECTING FAILURE OF VARIOUS ELEMENTS OF AN ADAPTIVE BRAKING SYSTEM THROUGH THE USE OF TRICKLE CURRENTS

[75] Inventors: Ralph W. Carr; Ward A. Ingels; Leoncio T. Ang, all of Newport News, Va.

[73] Assignee: The Bendix Corporation, Southfield, Mich.

[22] Filed: Apr. 13, 1973

[21] Appl. No.: 351,064

[52] U.S. Cl.............. 303/21 AF, 318/565, 324/51, 340/248 A
[51] Int. Cl.............................................. B60t 8/00
[58] Field of Search........ 303/21 AF; 318/563, 565; 324/51, 73 R, 133, 140 R; 340/52 B, 248 A

[56] References Cited
UNITED STATES PATENTS

| | | |
|---|---|---|
| 3,100,861 | 8/1963 | Osder................................. 318/565 |
| 3,245,213 | 4/1966 | Thompson et al........ 303/21 AF UX |
| 3,328,683 | 6/1967 | Davenport et al..................... 324/51 |
| 3,454,787 | 7/1969 | Gelernter...................... 340/248 AX |
| 3,556,611 | 1/1971 | Howard.......................... 303/21 AF |
| 3,702,206 | 11/1972 | Sweet.......................... 303/21 AF X |
| 3,746,981 | 7/1973 | Stone.............................. 324/133 X |

*Primary Examiner*—Trygve M. Blix
*Assistant Examiner*—Stephen G. Kunin
*Attorney, Agent, or Firm*—W. G. Christoforo; Bruce L. Lamb

[57] ABSTRACT

A circuit useful in adaptive braking systems for detecting sensor and load failures provides an operator warning and prevents automatic braking should a failure occur. Cross coupled comparators consider d.c. currents through the wheel speed sensors and interrupt electrical power to the braking system if a sensor is opened or shorted. A threshold circuit considers a trickle current through the brake pressure modulator to detect failures therein.

6 Claims, 1 Drawing Figure

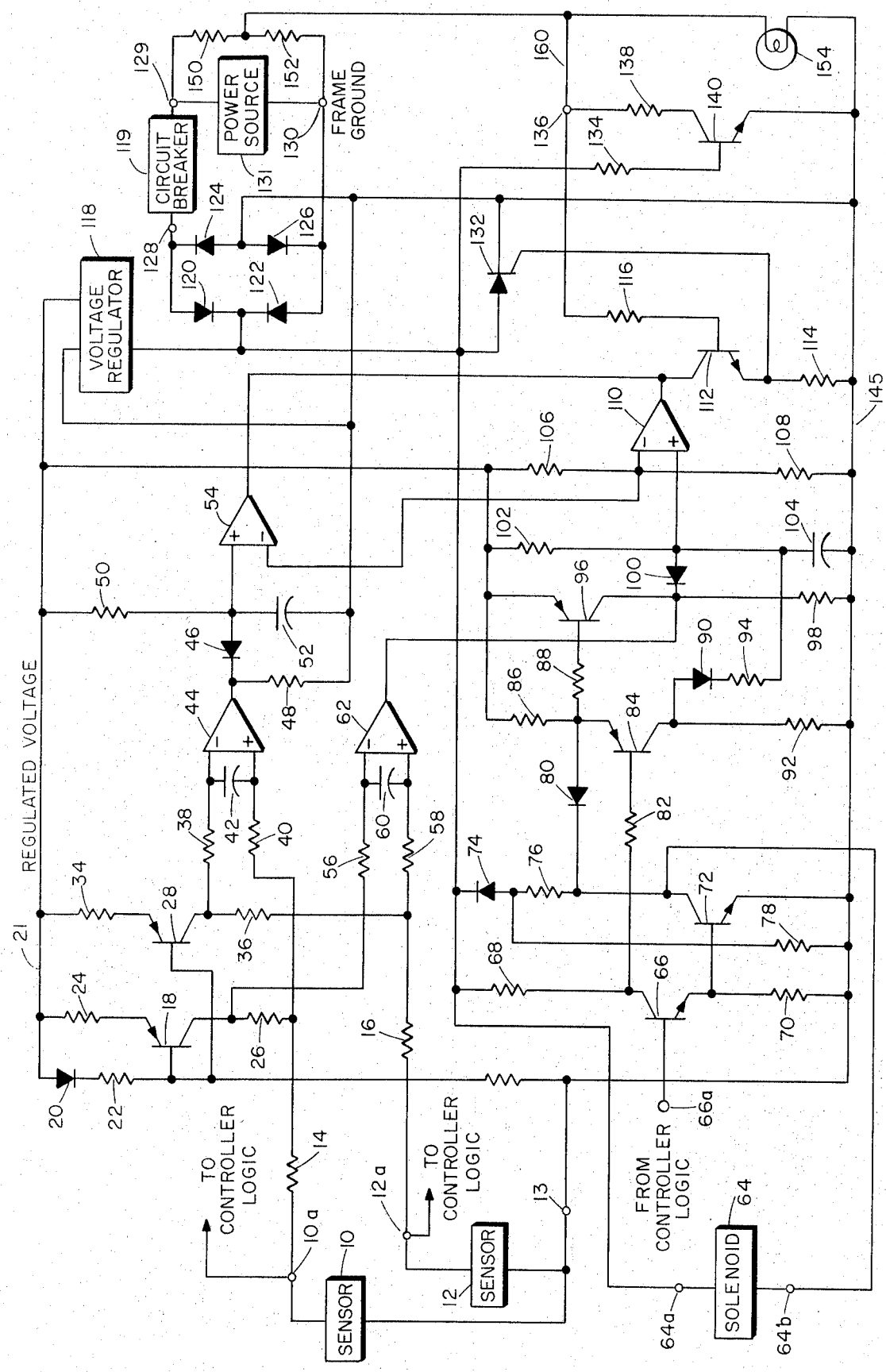

3,825,307

MEANS FOR DETECTING FAILURE OF VARIOUS ELEMENTS OF AN ADAPTIVE BRAKING SYSTEM THROUGH THE USE OF TRICKLE CURRENTS

BACKGROUND OF THE INVENTION

This invention relates to failure detection circuits for use in adaptive braking systems for wheeled vehicles, such as automobiles, trucks and the like, and more particularly to such circuits for detecting failures of adaptive braking systems having electrical wheel speed sensors and electrically responsive wheel braking pressure modulators.

Automatic braking systems are used in various types of wheeled vehicles to automatically control vehicle braking when system logic indicates that wheel lock is otherwise imminent. These systems generally are vehicle wheel speed or acceleration responsive and normally include wheel sensors which generate electrical signals which are proportional to a chosen wheel parameter such as speed or acceleration. These wheel sensors are generally similar to tachometers, having a rotor ganged to the sensed wheel and a cooperating stator in the form of an electrical winding.

Braking modulators are provided which adjust wheel braking force in response to electrical control signals received from system logic. These modulators are normally pilot operating devices wherein the electrical control signals from the logic circuit control the operation of a solenoid which in turn controls a power source fluid such as vacuum or hydraulic fluid to actually modulate braking pressure.

Since the braking of a vehicle is such a critical portion of its operation, it is desirable that any failure of the automatic braking system be registered to the vehicle operator and the automatic braking system disabled so that normal operator braking is maintained.

The present invention provides means for indicating whenever failures occur in the windings of the sensors or in the brake pressure modulator winding. To accomplish this a small d.c. trickle current is made to flow in the sensor windings in series with a standard resistor. The voltage drops across the standard resistor are detected by cross coupled comparators in such a manner that either an open winding or a shorted winding provides a failure indication. In like manner, a trickle current is made to flow in the modulator solenoid winding and an increase or disappearance of the trickle current is detected to provide an indication of failure.

It is thus an object of this invention to provide a circuit which will detect various failures in an adaptive braking system.

It is another object of this invention to provide a failure detection circuit which makes use of trickle currents through various elements to test their integrity.

DESCRIPTION OF THE PREFERRED EMBODIMENT

Refer to the FIGURE which is a schematic of a failure detection circuit. In this embodiment two sensors 10 and 12 are shown which are ganged respectively to two sensed wheels (not shown) and which provide electrical signals at their terminals which are applied to the adaptive braking system controller logic for the purpose of generating brake control signals should wheel skid or lock become imminent. The operation of adaptive braking systems is well known to those skilled in the art and will not be repeated at this time. It should be understood that blocks 10 and 12 represent the sensor stator windings in particular. Sensor 10 is connected across terminals 10a and 13, while sensor 12 is connected across terminals 12a and 13 which coincides with the circuit common terminal 145. A constant current source comprised of PNP transistor 18, diode 20 and resistor 22 has its emitter electrode connected through resistor 24 to the positive output terminal 21 of a voltage regulator 118 and its collector electrode connected through resistor 26 and resistor 14 to terminal 10a, whereby a constant d.c. trickle current is caused to flow in sensor 10. In like manner, a constant current source comprised of PNP transistor 28 and the same diode 20 and resistor 22 and having an emitter electrode connected through resistor 34 to terminal 21 and a collector electrode connected through resistors 36 and 16 to terminal 12a supplies an essentially identical trickle current to sensor 12. Resistors 24, 26 and 14 are designed to be approximately equal to resistors 34, 36 and 16, respectively, and the windings represented by blocks 10 and 12 are generally similar. The collector electrode of transistor 28 is connected through resistor 38 to the inverting terminal of an operational amplifier 44 which is operated open looped as a comparator. In like manner, the collector electrode of transistor 18 is connected through resistor 56 to the inverting terminal of a similar comparator 62. The non-inverting input terminal of comparator 44 is connected through resistor 40 to the common junction of resistors 14 and 26, while the non-inverting input terminal of comparator 62 is connected through resistor 58 to the common junction of resistors 16 and 36.

Resistors 38 and 40 together with capacitor 42, which is connected across the input terminals of comparator 44, comprise a low pass filter. Resistors 56 and 58 together with capacitor 60, connected across the input terminals of comparator 62, comprise another low pass filter. These filters permit the comparators to respond only to changes in the d.c. level at their inputs and provide blocking to the a.c. voltage generated by the sensors, the a.c. voltage comprising the signal proportional to the wheel parameter sensed. In this manner, false triggering of the comparators from the generated a.c. voltage is eliminated.

Under normal conditions, the voltage at the collector electrode of transistor 28 is higher than the voltage at the junction of resistors 14 and 26, a condition which forces the output of comparator 44 to be low. So long as the comparator output remains low, resistor 48, which is connected together with diode 46 across capacitor 52, provides a low impedance discharge path to prevent capacitor 52 from being charged through resistor 50 which is connected between one plate of capacitor 52 and positive terminal 21. The same plate of capacitor 52 is connected to the non-inverting input terminal of comparator 54, which is also an operational amplifier operated open looped. The inverting input terminal of comparator 54 is connected to the inverting terminal of a comparator 110, the common terminal being connected into the voltage divider comprised of resistors 106 and 108 connected across power terminals 21 and 145. Under these normal conditions, the comparator 54 non-inverting input terminal remains at a voltage potential less than the fixed bias voltage on the inverting input terminal, forcing the output of comparator 54 to remain low. This corresponds to the no-fault condition.

Also under normal conditions, the voltage at the collector of transistor 18 is higher than the voltage at the junction of resistors 16 and 36, a condition which forces the output of comparator 62 to be low. So long as the output of comparator 62 remains low, resistor 98 together with diode 100, connected across capacitor 104, prevent that capacitor from being charged through resistor 102 which is connected between one plate of capacitor 104 and terminal 21. This same plate of capacitor 104 is connected to the non-inverting input terminal of comparator 110. Under normal conditions, that is, under the no-fault condition, the voltage at the non-inverting input terminal is lower than the voltage at the inverting reference terminal so that the output of comparator 110 is low. It will be noted that the output terminals of comparators 54 and 110 are connected together in common to the collector electrode of NPN transistor 112.

Assume now the winding of sensor 10 becomes open. Under this condition transistor 18 will not be able to maintain the trickle current through the sensor. The voltage at the collector of transistor 18 will increase to a value higher than the voltage at the collector of transistor 28. Comparator 62 will not, at this time, change its state since only the voltage at its inverting input terminal has increased in value. At comparator 44, however, the voltage at the non-inverting input terminal will not be higher than the voltage at the inverting input terminal, thus comparator 44 will change state and go from a low level output to a high level output. Diode 46, which is connected between the output terminal of comparator 44 and the non-inverting input terminal of comparator 54, will be back-biased so that capacitor 52 will now charge through resistor 50. After a predetermined time delay, in accordance with the value of resistor 50 and capacitor 52, the voltage across capacitor 52 will exceed the voltage at the inverting input terminal of comparator 54 and the comparator will change state and generate a relatively high output signal which is applied to the collector electrode of transistor 112. The base electrode of transistor 112 normally receives a forward bias voltage from terminal 136 so that, with the high voltage now at its collector electrode, the emitter electrode of transistor 112 goes to a relatively high voltage. This high voltage is applied to the gate of silicone controlled rectifier 132, triggering this element to connect the common cathodes of diodes 120 and 122 to terminal 145. Diodes 120 and 122 which are connected across terminals 128 and 130, together with diodes 124 and 126, which are also connected across terminals 128 and 130, comprise a diode bridge. A circuit breaker 119 is connected between terminals 128 and 129. A power source 131 is connected across terminals 129 and 130. The diode bridge permits the polarity of power source 131 to be reversed without affecting operation of the circuit. Terminal 130 is normally connected to the vehicle frame. It should be noted that common terminal 145 is at a potential level which is one diode drop higher than the low end of power source 131, due to either diode 124 or 126 depending upon the polarity of the power source. With silicone controlled rectifier 132 triggered, excess current is drawn from power source 131, thus tripping circuit breaker 119 to disable the adaptive braking system by disconnecting power source 131 from the brake modulator solenoid 64 which will be described below.

Assume now that a short occurs between terminal 10a and common terminal 13. In this event the voltage at the collector electrode of transistor 18 will drop by an amount equal to the voltage that was across the now shorted sensor winding. This will place the level of the potential at the collector electrode of transistor 18 below the level of the potential at the junction of resistors 16 and 36. This will cause the output from comparator 62 to change state from a relatively low to a relatively high output signal. This increase in output signal level back-biases diode 100, and assuming that transistors 84 and 96 are not conductive at this time, capacitor 104 charges through resistor 102. After a predetermined time period the voltage at the non-inverting input terminal of comparator 110 is higher than at the inverting input terminal and comparator 110 changes state so that its output signal goes relatively high. As before, this high voltage is applied to the collector electrode of transistor 112, thus causing the voltage at the transistor's emitter electrode to go high to trigger the silicone controlled rectifier 132 to trip circuit breaker 119.

In like manner, an open circuit between terminals 12a and 13, that is an open winding in sensor 12, causes the same sequence of events as occurs with a short circuit across terminals 10a and 13. A short circuit across terminals 12a and 13 is identical to an open circuit across terminals 10a and 13.

Box 64 represents a solenoid winding of the brake pressure modulator and is connected across terminals 64a and 64b. Terminal 64a is connected through the diode bridge and circuit breaker 119 to power source 131, while terminal 64b is switchably connectable through the collector-emitter circuit of NPN transistor 72 to common terminal 145. A driver NPN transistor 66 has its collector electrode connected through resistor 68 to terminal 64a and its emitter electrode connected through resistor 70 to terminal 145 and additionally includes base electrode 66a connected to receive brake control signals from the controller logic. In order to energize winding 64 a positive signal is applied at terminal 66a, thus rendering transistors 66 and 72 conductive and thereby completing the power circuit through winding 64.

Terminal 64b is also connected through resistors 76 and 78 to return terminal 145, the resistance of these latter resistors being relatively high so that a small d.c. trickle current normally flows at all times in winding 64. A diode 74 is connected between the junction of resistors 76 and 78 and terminal 64a. This diode is provided to protect transistor 72 from the surge current which is generated when winding 64 is turned off.

It will be noted that the collector electrode of transistor 66 is connected through resistor 82 to the base electrode of PNP transistor 84 whose emitter electrode is connected through resistor 86 to terminal 21 and through diode 80 to the collector electrode of transistor 72 and whose collector electrode is connected through resistor 92 to terminal 145. The collector electrode of transistor 84 is also connected through diode 90 and resistor 94 to the plate of capacitor 104 which is connected in common with the non-inverting input terminal of comparator 110. In response to a brake control signal at terminal 66a the collector electrode of transistor 72 goes low so that diode 80 is forward biased and transistor 96 conducts. In addition, the emitter electrode of transistor 84 is pulled down below the voltage at its base electrode from the collector electrode of transistor 66 so that transistor 84 remains nonconductive. Since transistor 96 is now conductive, diode 100 is back-biased so that timing capacitor 104 receives charges through resistor 102. If the brake control signal at terminal 66a remains high longer than a predetermined time, which time depends upon the value of resistor 102 and capacitor 104, a fault is indicated, this condition being signaled by a change of state of comparator 110 which, as previously described in detail, triggers rectifier 132 to trip circuit breaker 119.

Normally the trickle current through winding 64 and resistors 76 and 78 maintains a high enough voltage at the anode of diode 80 to maintain that diode back-biased. However, if winding 64 becomes open so that no more trickle current can flow therethrough, diode 80 will become forward biased through resistors 76 and 78, thus permitting transistor 96 to become conductive thereby back-biasing diode 100. With diode 100 back-biased capacitor 104 can charge through resistor 102, eventually indicating a fault and tripping circuit breaker 119.

In case of a short in winding 64, so that terminals 64a and 64b are shorted, either circuit breaker 119 may trip directly due to the increased current. If not, the voltage at the collector electrode of transistor 66, which is connected through resistor 68 to terminal 64a, will be depressed sufficiently to permit transistor 84 to conduct, thereby charging capacitor 104 through diode 90 and resistor 94 to eventually cause circuit breaker 119 to otherwise trip.

A short between terminal 64b and terminal 145 or frame ground is detected in the same manner as an open winding 64, that is, the circuit detects the absence of trickle current through resistors 76 and 78. Of course, faults in the form of shorted transistors 66, 72 or 84 will permit capacitor 104 to charge sufficiently to indicate a fault and trip circuit breaker 119.

Terminal 136 is connected via line 160 to a failure monitor mounted to be observed by the vehicle operator. The failure monitor includes an indicator such as lamp 154 connected across terminals 136 and 145, with terminal 136 being connected to power source 131 through the voltage divider comprised of resistors 150 and 152. With transistor 140 conductive, as is normally the case, the voltage on line 160 is depressed sufficiently so that lamp 154 or other indicator is not energized. However, the voltage at line 160 is high enough to maintain transistor 112 forward biased even with transistor 140 conductive. In the case of a failure, at which time circuit breaker 119 opens, there is no longer any forward drive through resistor 134 to the base electrode of transistor 140 so that transistor ceases to conduct thereby permitting essentially the full voltage from the voltage divider comprised of resistors 150 and 152 to be impressed across indicator 154 so that it is thereby activated.

It will be noted that if line 160 is broken, such as by disconnecting the failure monitor, the forward drive for transistor 112 is removed so that thereafter failures cannot be indicated.

Although only a single embodiment of the invention has been shown, certain modifications and alterations in the invention should now be obvious to one skilled in the art. For example, if it were desired that the circuit operate even though line 160 were broken the forward drive for transistor 112 could be obtained from another point in the circuit. Accordingly, the invention is to be limited only by the true scope and spitit of the appended claims.

The invention claimed is:

1. Failure detection means for use in an adaptive braking system for wheeled vehicles including at least two sensors, each having a winding for generating an electrical signal proportional to a sensed vehicle wheel dynamic parameter, comprising:

at least two constant current sources, one associated with each said sensor and respectively supplying a constant d.c. current to its associated sensor;

at least first and second resistors, one associated with each said current source, said constant d.c. current being supplied to an associated sensor through an associated resistor;

first means comparing the potential at one end of said first resistor with the potential at another end of said second resistor for generating a first signal if the potential at said another end exceeds the potential at said one end;

a second comparator means comparing the potential at one end of said second resistor with the potential at another end of said first resistor for generating a second signal if the potential at said another end of said first resistor exceeds the potential at said one end of said second resistor;

first charge storage means for generating a utilization signal a predetermined time after said first signal has been continuously generated; and, a second charge storage means for generating said utilization signal a predetermined time after said second signal has been continuously generated.

2. Failure detection means as recited in claim 1 wherein said adaptive braking system is energized by a power source and including a utilization means responsive to said utilization signal for disconnecting said power source from said adaptive braking system whereby said adaptive braking system is inactivated.

3. Failure detection means as recited in claim 2 wherein said utilization means includes a silicone controlled rectifier means and a circuit breaker connected to energize power terminals whereby said adaptive braking system is energized, said silicone controlled rectifier means being responsive to said utilization signal for short circuiting said power terminals to thereby trip said circuit breaker.

4. Failure detection means as recited in claim 2 wherein said utilization means additionally includes indicator means responsive to said utilization signal for providing an indication of adaptive braking system failure to a vehicle operator.

5. The failure detection means of claim 1 wherein said adaptive braking system additionally includes at least one brake pressure modulator including a winding for controlling brake pressure in response to control signals, said failure detection means additionally comprising;

a power source having first and second terminals;

means connecting one end of the modulator winding to said first terminal;

switch means responsive to said control signals for switchably connecting the second end of said modulator winding to said second terminal;

resistive means shunting said switch means whereby a trickle current flows in said modulator winding and said resistive means;

means sensing the trickle current through said resistive means and responsive to the absence of said trickle current for generating said second signal.

6. The failure detector means of claim 5 wherein said first charge storage means comprises a time constant circuit including a capacitor, said time constant circuit being responsive to said first signal for accumulating charges and including a threshold circuit for generating said utilization signal when the voltage across said capacitor exceeds a predetermined threshold; and wherein said second charge storage means comprises a second time constant circuit including a second capacitor, said second time constant means being responsive to said second signal for accumulating charges and including a second threshold circuit for generating said utilization signal when the voltage across said second capacitor exceeds said predetermined threshold.

* * * * *